[15] 3,700,809
[45] Oct. 24, 1972

United States Patent

Nadon

[54] INDUCTIVELY COUPLED GRID CURSOR

[72] Inventor: Donald J. Nadon, 31449 Fairfax, Livonia, Mich. 48152

[22] Filed: Aug. 31, 1971

[21] Appl. No.: 176,453

[52] U.S. Cl.........178/87, 340/146.3 SY, 340/365 L, 178/18

[51] Int. Cl...........................................H04l 21/02

[58] Field of Search....340/146.3 SY, 365 L; 178/87, 178/18, 19, 20, 21

[56] References Cited

UNITED STATES PATENTS

| | | | |
|---|---|---|---|
| 3,532,817 | 10/1970 | Jones et al. | 178/19 |
| 3,376,551 | 4/1968 | Armbruster | 178/18 |
| 3,647,963 | 3/1972 | Bailey | 178/19 |
| 3,466,646 | 9/1969 | Lewin | 178/18 |
| 3,598,903 | 8/1971 | Johnson et al. | 178/18 |

OTHER PUBLICATIONS

" Signal Communication Apparatus," IBM Technical Disclosure Bulletin, K.A. Ahmad, Vol. 3 No. 6 Nov. 1960, page 22.

*Primary Examiner*—Kathleen H. Claffy
*Assistant Examiner*—Horst F. Brauner
*Attorney*—Lester L. Hallacher et al.

[57] ABSTRACT

A cursor for taking position signals from a grid is includes a coil through which inductive coupling with the grid is established. Because inductive coupling is employed, there need be no physical contact between the cursor and the grid. The cursor is configured so that the effects of orientation changes of the sensor parallel to the plane of the grid are eliminated and the effects of orientation changes normal to the plane of the grid are minimized. Furthermore, the cursor includes a low reluctance magnetic element which provides a low impedance path for the magnetic flux within the cursor. An air gap is provided in the low reluctance element in the vicinity of the cursor which is in the closest proximity to the grid so that the magnetic field is concentrated at the grid, thereby permitting inductive coupling without the cursor physically contacting the grid.

14 Claims, 2 Drawing Figures

INVENTOR
DONALD J. NADON

BY Luther L. Hallacher
ATTORNEY

INDUCTIVELY COUPLED GRID CURSOR

BACKGROUND OF THE INVENTION

Various types of systems in which the position of a cursor along a grid structure are taken are known in the art. In many systems the cursor is moved along the grid and current flowing through the grid causes the induction of voltages into the cursor. Usually the cursor includes a switch which is closed when the cursor is placed on the grid surface, thus permitting a current flow through the cursor. The current flow is dependent upon the induced voltages and thus constitutes output signals indicative of the position of the cursor along the grid. These systems are disadvantageous because the requirement of closing the switch requires the cursor to be in contact with the grid, thereby greatly increasing the drag of the cursor with respect to the grid. This is very disadvantageous in systems requiring automatic plotting, because in such systems the drag created between the cursor and the grid is very significant and causes inaccurate positioning of the cursor with respect to the grid.

Furthermore, in many prior art systems the cursor configuration is such that the orientation of the cursor with respect to the grid becomes important. This is so because the inductive coupling between the cursor and the grid is changed as the cursor is rotated in the plane of the grid or tilted from the plane perpendicular to the grid. This is disadvantageous because in many cases, particularly when the cursor is used by hand, there is some rotational movement of the cursor within the plane of the grid and tilt in the other plane, thereby resulting in inaccurate readings.

The configuration of many prior art cursors is not concerned with concentrating the maximum magnetic flux to that portion of the cursor which is in the closest proximity of the grid structure, and therefore either actual contact with the grid or very close positioning to the grid is required in order to realize the inductive coupling required to produce meaningful output signals. This is a disadvantage because actual contact greatly increases cursor drag and close spacing is very sensitive to variation caused by movement of the cursor.

SUMMARY OF THE INVENTION

The inventive cursor overcomes these deficiencies because it is configured to direct the magnetic flux pattern toward a point at the end of the cursor which is in the most proximate position with respect to the grid surface. Furthermore, the inventive grid is continually energized so that no contact with the grid is required to close a contact sensitive switch. Accordingly, the cursor need not come into contact with the grid in order to be operative and drag between the cursor and grid is thus eliminated. Because the cursor is spaced from the grid, inductive coupling occurs through the air gap which exists between the tip of the cursor and the grid. However, the cursor is configured to direct the maximum amount of flux to the tip of the cursor and accordingly there is strong and effective coupling between the cursor and the grid even when the cursor is as much as a quarter of an inch away from the grid.

The cursor has radial symmetry around an axis perpendicular to the plane of the grid, and therefore rotational orientation changes around this axis cause no detrimental effect on the inductive coupling between the cursor and the grid. However, angular orientation changes of the cursor away from an axis which is perpendicular to the surface of the grid may result in nonuniform inductive coupling around the sensor, and thus may result in some inaccuracy in the output reading. This effect is minimized by the inventive configuration of the cursor because the magnetic flux is concentrated toward a point at the end of the cursor which is in the nearest proximity to the grid, and accordingly substantial coupling occurs around the entire cursor periphery even when there is a substantial inclination of the cursor with respect to the grid surface.

DETAILED DESCRIPTION

Figure 1:
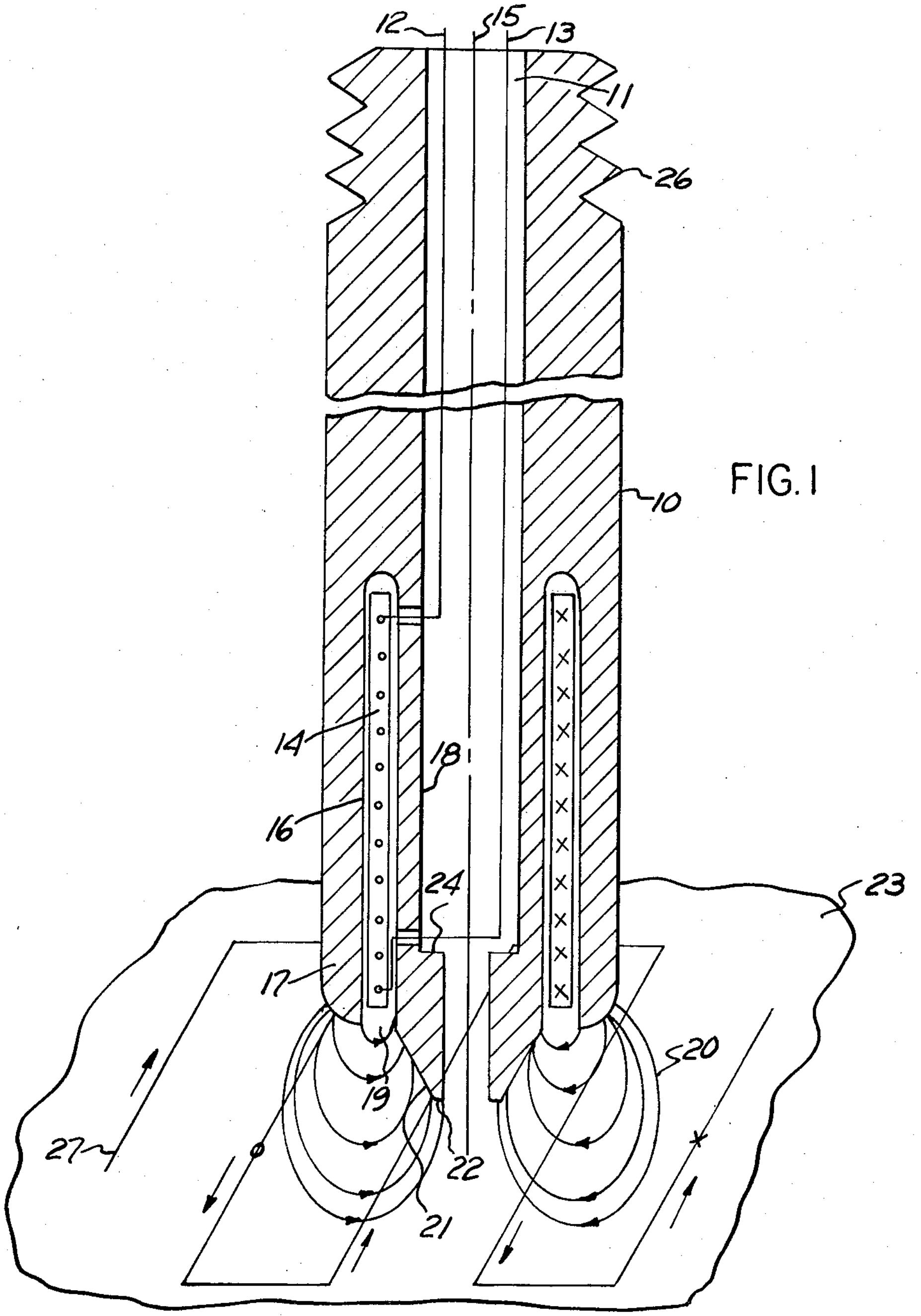
FIG. 1 is a preferred embodiment of the inventive structure.

The embodiment of the invention shown in FIG. 1 includes a ferro-magnetic support Structure 10 which is made from a material having a low magnetic reluctance and which therefore provides a low impedance path for the magnetic field established in the cursor. The cursor is cylindrical so that a longitudinal Bore 11 concentrically extends the entire length of the cursor. Bore 11 provides a means for bringing electrical Leads 12 and 13 out through the cursor so that the cursor can be coupled to an electrical detection circuit or an electrical energization circuit. Leads 12 and 13 are the ends of the Coil 14 formed within the Cursor 10.

Coil 14 is shown in the usual convention for a coil wherein the X's on the right-hand side indicate current flowing into the paper and the dots on the left-hand side indicate current flowing out through the paper. It should therefore be understood that Coil 14 is a continuous coil having a desired number of turns of a convenient wire size. Coil 14 is positioned concentrically within Cursor 10 in an Annular Slot 16 which extends from the lower end of the cursor upwardly into the interior of the cursor. Slot 16 therefore also is annular so that it is capable of receiving Circular Coil 14. It is now apparent that Coil 14 and Cursor 10 have radial symmetry about the Longitudinal Axis 15 of the cursor.

The presence of Annular Slot 16 results in an Outer Annular Portion 17 and an Inner Annular Portion 18, which form the magnetic circuit about Coil 14. Magnetic flux within the cursor flows through the low magnetic impedance circuit which includes Outer Portion 17, the material around the upper end of Slot 16, Inner Annular Portion 18, and Air Gap 19.

Because of the Air Gap 19 and the configuration of Cursor 10, a Flux Path 20 similar to that illustrated in FIG. 1 is created at the end of the cursor when Coil 14 is energized via Leads 12 and 13. The end of the cursor is configured similarly to an inverted cone at end Portion 21 and ends in a relatively Pointed Section 22. Because of this configuration the center of the cursor can be very accurately located with respect to Grid 23 along which coordinate measurements are to be taken. Aperture 11 contains a Stepped Portion 24 so that the aperture at the Measuring End 22 of the cursor is much smaller than that at the top end of the cursor. This enhances the accuracy of the cursor because it permits a substantial reduction in the diameter of the Pointed End 22 of the cursor.

It will be noted that the upper end of the cursor includes a Portion 26 which is threaded to receive a non-magnetic closure member (not shown) which is used to conveniently close the cursor and also to extend its length if required. Furthermore, the closure can be used to couple the cursor to automatic positioning equipment which is used to automatically position the cursor along the grid surface. Because the closure is nonmagnetic its presence has no effect on the operation of the cursor.

Grid 23 includes a Conductive Element 27 which, in the example shown, is a continuous convoluted conductor so that current can flow therein. As a consequence, when Leads 12 and 13 of Coil 14 are energized by a source (not shown) current in Cursor Coil 14 induces a voltage into Conductor 27 because the flux lines which extend across Air Gap 19 of the cursor intersect the conductor. It should also be noted that, if desired, the continuous Conductor 27 can be energized so that magnetic coupling occurs across the grid and cursor, and voltages are introduced into Coil 14 so that the output signals are taken from Leads 12 and 13 of the cursor.

The inventive cursor configuration results in the flux pattern shown in FIG. 1. This flux pattern results in a maximum of inductive coupling between the cursor and the grid. The magnetic field which is established when Coil 14 is energized has a low impedance path at all portions of the magnetic circuit except at Air Gap 19. As a consequence, the flux at Gap 19 is quite dense and concentrated. Furthermore, the flux is extended from the wall of Conical Portion 21 to the Outer Magnetic Ring 17. The pattern therefore is somewhat elliptical with the major axis substantially vertical. Accordingly, a well defined annular flux pattern is formed around the end of the cursor.

One major advantage of the inventive cursor is the ability to dimension the measuring end of the cursor to be smaller than the spacing between adjacent portions of Conductor 27 of Grid 23. With the cursor dimension equal to or less than one-half of the conductor spacing induction into adjacent conductor portions is maximized. The flux pattern is also restricted in size by the disclosed cursor configuration, additionally enhancing the accuracy of the inventive cursor by maximizing induction to adjacent conductor portions. This is an advantage which cannot be realized in prior art cursors because they suggest decreasing the flux pattern by decreasing the coil diameter. This can be acceptable but reaches a practical limitation because coils with small diameters are extremely difficult to wind. Accordingly, if the spacing of Conductor Portions 27 is small, as it will be when high accuracy measurements are desired, it is impossible to wind Coil 14 with a sufficiently small diameter.

Because Coil 14 is annular, it has radial symmetry about Longitudinal Axis 15 of the cursor. As a consequence, rotational movement of the cursor about the Longitudinal Axis 15 and in the plane of the Grid 23 have no effect on the induction which occurs between the Coil 14 and the Grid 23, and therefore the output signals are also unaffected. However, tilt of the cursor, that is the tilting of the cursor so that Axis 15 is not perpendicular to the plane of Grid 23, causes the flux coupling to change and thereby change the output signals. However, because of the configuration of the flux pattern which results from the inventive features of the cursor this effect is minimized. Tilt sensitivity is also decreased because the inventive cursor configuration concentrates the magnetic flux at the tip of the cursor where inductive coupling occurs.

Figure 2:
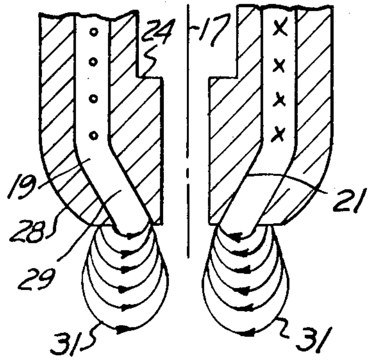
FIG. 2 is another preferred embodiment of the inventive structure.

The inaccuracy which can occur upon tilting the cursor of FIG. 1 with respect to the grid may be unacceptable in some systems. In such systems it will be desirable to modify the cursor in the manner shown in FIG. 2. In FIG. 2 the cursor is very similar to that shown in FIG. 1, and therefore only the lower end of the cursor is illustrated. The FIG. 2 embodiment includes an additional Tip 28 which extends downwardly along side of Conical Tip 21. Extension 28 and Tip 21 form a conical Air Gap 29. Extension 28 and Tip 21 are dimensioned so that Gap 29 is substantially parallel to Grid 23. Tip 28 is also formed of a material having a low magnetic reluctance. This configuration results in a Flux Pattern 31 as illustrated in FIG. 2. The pattern is narrower than that of FIG. 1 and extends downwardly further from the air gap. As a consequence, the cursor is less sensitive to tilt of Longitudinal Axis 15 away from the perpendicular to Grid 23 because the flux line concentration is such that the flux pattern is concentric about Axis 15 and extends further away from Air Gap 29. The result is the cutting of Conductor 27 by a large number of flux lines, even when the cursor is tilted.

It will be noted that the additional Tip 28 is shown as an integral part of the cursor. However, this would make it difficult to insert Coil 14 in Slot 16. Tip 28 therefore would preferably be a separate member which is threaded or otherwise applied to the main cursor body.

What is claimed is:

1. A cursor for inductively coupling signals between said cursor and the conductors of a grid comprising:

a low reluctance body portion providing a low impedance path for magnetic flux, said body portion having a tapered end to define a narrowed portion in the proximity of said grid;

an air gap arranged in said body portion in the proximity of said end so that magnetic flux is concentrated at said end and intersects said grid conductors;

said body portion supporting a coil element for establishing magnetic coupling between said cursor and said grid, said coil element and said portion having symmetry in a plane parallel to said grid so that orientation changes of said cursor in said plane has no effect on said coupling.

2. The cursor of claim 1 wherein said narrowed portion is smaller than the spacing of adjacent conductors of said grid so that maximum coupling occurs at adjacent conductors.

3. The cursor of claim 2 wherein said body portion is a cylinder and contains an aperture for receiving said coil.

4. The cursor of claim 2 wherein said body portion is a hollow cylinder, and contains an annular slot extending from said narrowed portion through at least a portion of the length of said cylinder so that the opening of said slot forms said air gap, said slot supporting said coil concentrically with said body portion.

5. The cursor of claim 2 wherein said conductor spacing is at least twice as great as the dimension of said narrowed portion.

6. The cursor of claim 4 wherein said conductor spacing is at least twice as great as the dimension of said narrowed portion.

7. The cursor of claim 6 further including means for retaining a nonmagnetic closure portion on the other end of said body portion.

8. The cursor of claim 6 wherein the diameters of said body portion and said coil exceed one-half of said conductor spacing.

9. The cursor of claim 3 wherein said air gap is defined by said narrowed portion and the outer side of said cylinder, and said outer side is spaced further from said grid than said narrowed portion when said body cylinder is normal to said grid.

10. The cursor of claim 4 wherein said air gap is defined by said narrowed portion and the outer side of said cylinder, and said outer side is spaced further from said grid than said narrowed portion when said body cylinder is normal to said grid.

11. The cursor of claim 8 wherein said air gap is defined by said narrowed portion and the outer side of said cylinder, and said outer side is spaced further from said grid than said narrowed portion when said body cylinder is normal to said grid.

12. The cursor of claim 3 wherein said air gap is arranged in said narrowed portion and is substantially parallel to said grid.

13. The cursor of claim 4 wherein said air gap communicates with said annular slot and is substantially parallel to said grid.

14. The cursor of claim 8 wherein said air gap communicates with said annular slot and is substantially parallel to said grid.

* * * * *